United States Patent [19]

Ferris

[11] Patent Number: 4,709,795

[45] Date of Patent: Dec. 1, 1987

[54] HYDRAULICALLY-ACTUATED STARTING CLUTCH ASSEMBLY WITH BALANCED PISTON ACTUATION

[75] Inventor: Ernest A. Ferris, Oakbrook, Ill.

[73] Assignee: Borg-Warner Corporation, Chicago, Ill.

[21] Appl. No.: 884,347

[22] Filed: Jul. 11, 1986

Related U.S. Application Data

[63] Continuation of Ser. No. 685,682, Dec. 24, 1984.

[51] Int. Cl.$^4$ .................... F16D 25/063; F16D 13/50
[52] U.S. Cl. ............................ 192/106 F; 192/70.28; 192/85 AA
[58] Field of Search ........... 192/106 R, 106 F, 103 F, 192/104 R, 70.28, 70.12, 113 B, 70.27, 70.13, 70.16, 70.19, 70.2, 70.29

[56] References Cited

U.S. PATENT DOCUMENTS

| | | | |
|---|---|---|---|
| 940,679 | 11/1909 | Evans | 192/70.28 X |
| 2,063,203 | 11/1936 | Stanley | 192/70.28 |
| 2,684,742 | 7/1954 | Eason | 192/85 AA |
| 2,876,743 | 3/1959 | Maki | 192/85 AA |
| 2,966,978 | 11/1962 | Kaptur | 192/106 F |
| 3,064,780 | 11/1962 | Richards et al. | 192/86 |
| 3,213,984 | 10/1965 | Cook | 192/85 AA X |
| 3,213,989 | 10/1965 | Harting | 192/86 |
| 3,236,349 | 2/1966 | Wiggins et al. | 192/85 AA X |
| 3,570,638 | 3/1971 | Baker et al. | 192/89 B X |
| 3,863,746 | 2/1975 | Schulz | 192/106 F |
| 4,014,619 | 3/1977 | Good et al. | 403/359 |
| 4,520,912 | 6/1985 | Ferris et al. | 192/85 AA |

FOREIGN PATENT DOCUMENTS 940405 10/1963 United Kingdom .......... 192/85 AA

Primary Examiner—George H. Krizmanich
Attorney, Agent, or Firm—James A. Geppert

[57] ABSTRACT

A hydraulically-actuated starting clutch, and more particularly a starting clutch for a continuously variable transmission which is located at the output of the transmission to couple the vehicle wheels to the engine upon a signal from a throttle-induced system oil pressure. The clutch includes a housing connected to the drive shaft through a hub and forming a pressure chamber behind an annular piston, a Belleville spring connecting the driving shaft hub and a pressure plate together for simultaneous rotation; the piston urging the pressure plate against a clutch plate and an end plate secured in the housing. The piston includes a plurality of axial projections thereon contacting the surface of the pressure plate opposite to the clutch plate, and the clutch plate is operatively connected to a driven concentric sleeve shaft to drive the vehicle wheels. An annular balance cap secured in the housing between the piston and pressure plate has openings closely receiving the piston projections and provides a centrifugally shrouded zone for cooling oil to react against the centrifugal force acting on the hydraulic fluid urging the piston against the pressure plate.

11 Claims, 2 Drawing Figures

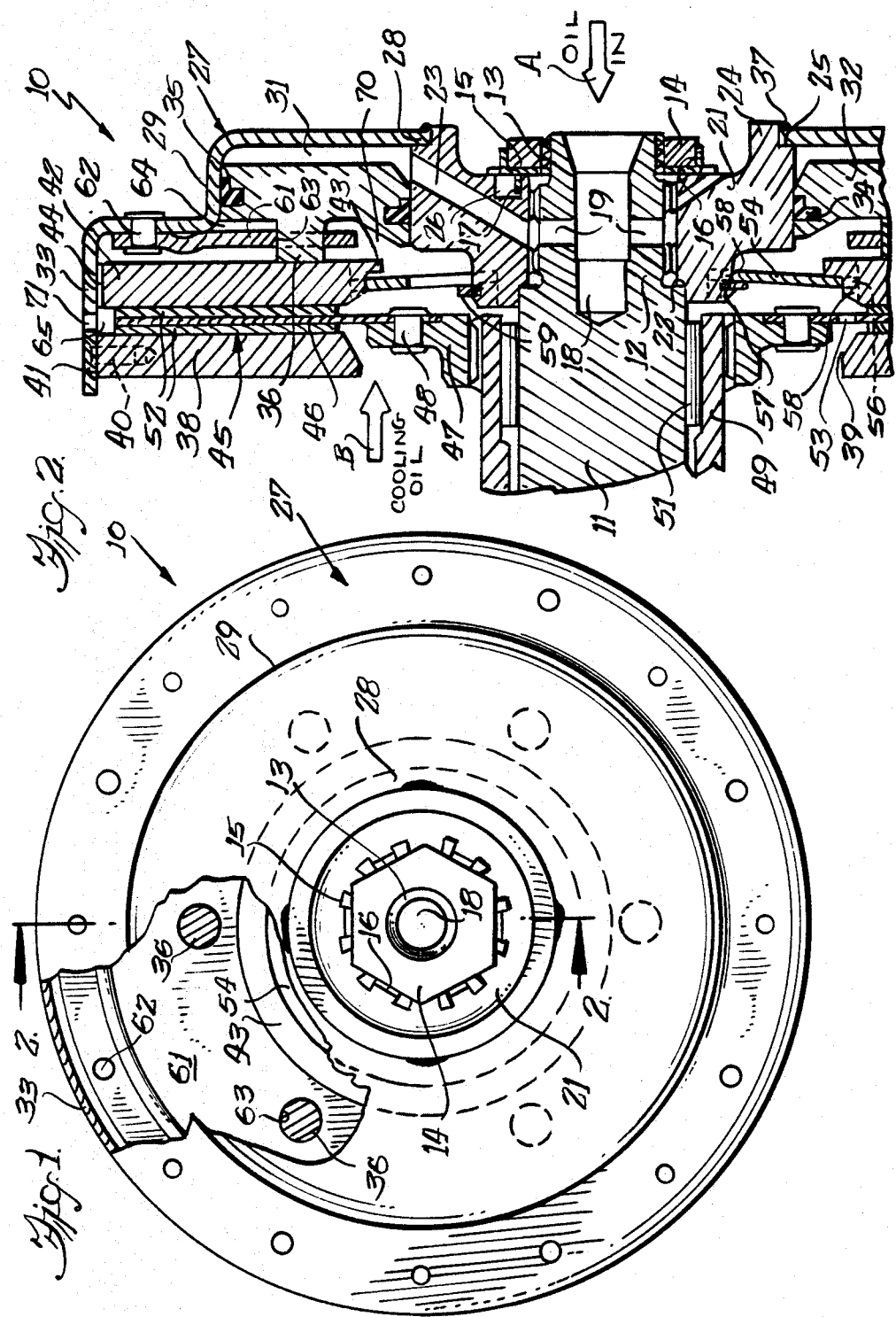

HYDRAULICALLY-ACTUATED STARTING CLUTCH ASSEMBLY WITH BALANCED PISTON ACTUATION

This is a continuation of application Ser. No. 685,682 filed Dec. 24, 1984.

BACKGROUND OF THE INVENTION

The present invention relates to a hydraulically actuated starting clutch, and more specifically to a starting clutch assembly for a continuously variable transmission in an automotive vehicle. Continuously variable transmissions have been known for several years as a driving assembly between a vehicle engine and the road engaging wheels to provide a smooth acceleration without the usual shifting of gears found in most automatic transmissions. A continuously variable transmission can include variable sheave pulleys, an endless belt extending between and engaging the pulleys, and control means to alter the effective pulley diameters and thus change the speed ratio.

It automotive applications, it is necessary to incorporate a suitable clutch assembly in the drivetrain as a starting device and planetary gearing to effect desirable gear reduction and to provide for forward-neutral-reverse gear mechanisms. It is desirable to have the pulleys constantly rotating when the vehicle engine is running, even at an idle rpm, so that initiation of movement of the vehicle is accomplished by a throttle responsive friction starting device, such as a clutch, located at the output of the transmission, and a forward-neutral-reverse mechanism is preferably located in conjunction with or subsequent to the starting device.

Problems will arise in the resultant centrifugal force of a rotating clutch which traditionally provides liquid pressure that may influence actuation of the clutch. Further problems include engine stalling during rapid vehicle braking and lack of smoothness of clutch engagement during acceleration of the vehicle. The present invention overcomes these various problems in the form of a novel starting clutch assembly.

SUMMARY OF THE INVENTION

The present invention comprehends the provision of a novel starting clutch arrangement, particularly for a continuously variable transmission in an automotive vehicle, which is located at the output of the vehicle transmission to make the device automatic in coupling the vehicle engine to the driving wheels upon a signal from the throttle-induced system oil pressure. Where there is no throttle signal, the clutch will substantially completely disengage so as to prevent vehicle creep due to viscous drag resulting from the cooling fluid flow between the clutch engaging surfaces. This clutch will also act as a torque "fuse" for the cone-belt drive system of the continuously variable tranmission and is so sized as to slip before the metallic pulley belt slips.

The present invention also comprehends the provision of a starting clutch in the form of a hydraulically-operated wet clutch including an annular piston acting on the clutch pressure plate through a plurality of axially extending posts. A balance cap or shroud is secured adjacent its periphery onto the clutch cover and acts to compensate for the centrifugal effect of oil behind the actuating piston and has openings therein receiving the posts. A Belleville spring in the cover acts to urge the pressur plate to its retracted position.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a front elevational view of the starting clutch of the present invention with portions broken away to show the internal clutch structure.

FIG. 2 is a partial cross sectional view of the clutch taken on the line 2—2 of FIG. 1.

DESCRIPTION OF PREFERRED EMBODIMENT

Referring more particularly to the disclosure in the drawing wherein is shown an illustrative embodiment of the present invention, FIGS. 1 and 2 disclose a hydraulically-actuated starting wet clutch 10 mounted on a driving shaft 11 from a continuously variable transmission (not shown), such as illustrated in U.S. Pat. No. 4,241,618. The shaft has a stepped end portion 12 terminating in a reduced threaded end 13 receiving an internally threaded nut 14 and a locking washer 15 with locking tabs 16 adapted to engage the flats on the nut once the nut is tightened onto the shaft. The end of the shaft has a central opening or passage 18 therein communicating with several generally radial feed holes or passages 19.

A generally annular hub 21 is received on the stepped end portion 12 by a splined connection and retained thereon by the nut 14; the axial force of the nut acting on the washer 15 and hub 21 to hold the hub against a shoulder 22 defining the stepped portion of the shaft. The hub includes several generally radial fluid passages 23 whose circular alignment corresponds with feed passages 19, with alignment retained due to the splined connection. The hub includes an axially extending annular flange 24 defining a shoulder 25 receiving the inner periphery 28 of a clutch cover or housing 27. Also, the outer face of the hub is provided with several circumferentially spaced holes 26 receiving locking tabs 17 on the washer 15 extending in the opposite direction from tabs 16. The housing is stepped at 29 to define a chamber 31 accomodating an axially movable piston 32 and then extends outwardly to terminate in an axial flange portion 33. The piston 32 includes inner and outer annular resilient lip seals 34 and 35 engaging the periphery of the hub 21 and the stepped wall 29 of the housing 27 to seal the piston in chamber 31. On the face of the piston opposite to the chamber 31 are a plurality of circumferentially equally spaced axially extending cylindrical projections 36. The housing 27 is secured to the hub at 37 as by welding.

An end plate 38 has an inner beveled surface 39 and an outer periphery 41 secured to the axial flange portion 33 by screws 40 or other suitable means. Also, an annular pressure plate 42 has an inner lip 43 and an outer periphery 44 slidably mounted in the housing. Between the end plate 38 and the pressure plate 42 is positioned a clutch plate 45 having a core plate 46 secured to a powdered metal hub 47 through suitable fastening means, such as rivets 48 received in openings in the core plate and hub. The hub 47 is internally splined to receive the splined end of a sleeve or driven shaft 49 encompassing the shaft 11 and rotatably mounted on bearings 51; the sleeve shaft 49 acting to drive the vehicle wheels through a suitable differential (not shown).

The clutch plate includes a pair of oppositely disposed friction facings 52,52 formed preferably of a nonasbestos, high coefficient material that are adhesively bonded to the core plate 46. The facings are suitably grooved and provided with feeder slots for high cooling oil flow (arrow B) through the clutch at low back pressure. The cooling oil can flow through perforations 53 in the core plate so as to cool both surfaces of the clutch plate, and oil is encouraged to linger in the annular "neighborhood" of the clutch plate by reason of the machined bevel surface 39 at the inner diameter of the end plate 38.

A Belleville spring 54 has teeth 55 at its internal diameter engaging corresponding teeth 57 formed on a shoulder of the hub 21 adjacent the shoulder 22 on the shaft 11 and teeth 56 at its outer diameter engaging teeth 58 formed in the inner periphery of the pressure plate 42. A snap ring 59 on the hub retains the inner periphery of the Bellevlle spring 54 on the hub 21, and the lip 43 on the pressure plate 42 in conjunction with the force of the spring retains the spring on the pressure plate. Thus, the Belleville spring acts to retract or return both the pressure plate and the piston and acts to centralize the pressure plate relative to the hub. Also, the teeth on the spring acts to rotatably connect the hub and the pressure plate, thus obviating a splined connection between the pressure plate and housing.

A balance cap or centrifugal shroud 61 in the form of an annular plate is secured to the housing, such as by rivets 62, adjacent its outer diameter as seen in FIG. 2 and is provided with a pluralilty of circumferentially equally spaced openings 63 recieving the piston projections 36 in close fitting relationship. The clearance 70 between the inner diameter of the shroud and piston 32 allows casual oil to reside in the centrifugal shrouded zone 64 to substantially balance the oil on the other side of the piston 32 and thus prevent unwanted "apply" of the piston at high rotating speeds.

Hydraulic fluid under pressure is supplied from a throttle-induced pump (not shown) in the vehicle drive system as shown by arrow A in FIG. 2 through a conduit communicating with the passage 18 of the rotating joint to actuate the piston 32 in pressure chamber 31. Also, the complete assembly 10 has a housing (not shown) encompassing the assembly, and a source of cooling fluid is available at the left-hand end of the assembly as shown by arrow B in FIG. 2 to cool the friction surfaces of the clutch plate, pressure plate and end plate; the pressure plate 42 and end plate 38 both being relatively thick to provide an adequate heat sink to handle short but high-powered clutch engagements. As the variable transmission pulleys are accelerated from idle rpm, the fluid pump increases the hydraulic pressure applied through the supply conduit and passages 18, 19 and 23 to the pressure chamber 31 to urge the piston 32 to the left as seen in FIG. 2. The projections 36 on the piston act directly upon the rear surface of the pressure plate 42 against the restraint of the Belleville spring 54 to urge the pressure plate into frictional contact with the friction clutch plate 45 to engage the end plate 38 and cause rotation of the sleeve shaft 49 to drive the vehicle wheels upon being coupled to rotation of the driving shaft 11.

The Belleville spring is provided with inner and outer teeth so that continuous rotation of the driving shaft 11 and hub 21 results in rotation of the Belleville spring 54 and pressure plate 42. Also, the housing 27 and end plate 38 secured thereto rotate with the shaft 11 and hub. If it were not for the access to the pressure plate 42 through the opening 63 in the balance cap 61 by the projections 36, the clutch lock-up force would have to be at the extreme inward diameter of the pressure plate where undesirable deflection might occur. The cooling oil enters the clutch in the annular zone designated by arrow B, with some oil passing through the perforations 53 in the clutch disc or core plate 46 to reach the other side. After passing through grooves in the clutch plate lining 52, oil exits in the area 65 through holes 71 in the housing flange portion 33. Also, some oil passes through slots in the Belleville spring and clearance 70 to reside in the centrifugal shrouded zone 64 and compensate for the centrifugal effect of the oil in the pressure chamber 31 and thus prevent unwanted partial application of the piston at high rotative speed, such as 10,000 rpm. Also, it is difficult to keep the clutch capacity in its proper relationship to the transmission belt capacity for the pulley if centrifugal hydraulic forces are allowed to interfere.

The Belleville spring serves the following functions:
(1) It acts as a return spring for the piston.
(2) It determines the pressure for engagement of the clutch.
(3) It centralizes the annular pressure plate in the housing and drives the pressure plate through its connection with the hub and the shaft.

When the operator releases the throttle during operation of the vehicle, the hydraulic pressure rapidly decreases and the Belleville spring 54 acts to retract the piston 32 and disengage the clutch plate cleanly sufficiently to prevent vehicle creep. Although shown and described as a starting clutch for a continuously variable transmission, it is obvious that this clutch can be utilized in other tranmission arrangements where a starting clutch is necessary or desirable.

I claim:

1. A starting clutch adapted to engage upon a signal from a throttle-induced system oil pressure to couple a driving shaft with a driven concentric sleeve shaft, comprising a hub operatively connected to rotate with the continuously rotating driving shaft, a clutch housing secured to said hub and having an intermediate step and an axial flange portion, said hub and stepped portion of the housing defining an annular pressure chamber therein receiving an axially reciprocable annular piston, a clutch plate carrying friction facings, a second hub operatively connected to the driven sleeve shaft and secured to the clutch plate, an end plate secured to said axial flange portion, a pressure plate axially reciprocable in said housing on the opposite side of the clutch plate from the end plate, a Belleville spring in said housing and operatively connected between said pressure plate and hub for driving rotation therewith, a plurality of axial projections on said piston contacting said pressure plate to move it against the clutch plate and end plate, and a source of hydraulic pressure communicating with said pressure chamber.

2. A starting clutch as set forth in claim 1, including an annular balance cap mounted in said housing to extend inwardly adjacent the forward face of said piston opposite said pressure chamber to entrap casual oil therebetween to substantially balance the oil in the pressure chamber under centrifugal force.

3. A starting clutch as set forth in claim 2, wherein said balance cap has an inner diameter and circumferentially spaced openings therein closely accommodating said piston projections.

4. A starting clutch as set forth in claim 1, wherein said Belleville spring has toothed inner and outer peripheries engaging said hub and pressure plate.

5. A starting clutch as set forth in claim 3, wherein clearance between the inner diameter of said balance cap and said piston allows a portion of cooling fluid for said clutch plate to react with the forward face of said piston under centrifugal force.

6. A starting clutch as set forth in claim 1, wherein said annular piston is generally axially aligned with said pressure plate with said axial projections on said piston directly contacting said pressure plate.

7. A starting clutch as set forth in claim 1, including an annular balance cap mounted in said housing to extend inwardly adjacent the forward face of said piston opposite said piston chamber to entrap casual oil therebetween and substantially balance the oil in the pressure chamber under centrifugal force, said balance cap having spaced openings receiving said piston projections therethrough.

8. A starting clutch as set forth in claim 4, wherein said Belleville spring acts to rotatably drive said pressure plate and to retract said pressure plate upon deactivatin of said piston.

9. A diaphragm-type spring to transmit torque between an inner rotating member and an annular outer member, comprising an annular cone-shaped spring member having an inner notched periphery and an outer notched periphery, and said inner rotating member and annular outer member having complementary notched surfaces thereon engaging the notched peripheries of said spring member.

10. A diaphragm-type spring as set forth in claim 9, wherein said notched peripheries define teeth engaging complementary teeth formed on the inner and outer members.

11. A diaphragm-type spring as set forth in claim 10, in which said spring allows axial reciprocation of said outer member and acts to retract said outer member to its original position.

* * * * *